US009148028B2

(12) United States Patent
Suzuki et al.

(10) Patent No.: US 9,148,028 B2
(45) Date of Patent: Sep. 29, 2015

(54) APPARATUS AND METHOD FOR BATTERY EQUALIZATION

(71) Applicant: KABUSHIKI KAISHA TOYOTA JIDOSHOKKI, Kariya (JP)

(72) Inventors: Masaaki Suzuki, Kariya (JP); Shinji Hirose, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 524 days.

(21) Appl. No.: 13/668,600

(22) Filed: Nov. 5, 2012

(65) Prior Publication Data

US 2013/0113432 A1 May 9, 2013

(30) Foreign Application Priority Data

Nov. 8, 2011 (JP) ................. 2011-244310

(51) Int. Cl.
H02J 7/00 (2006.01)
(52) U.S. Cl.
CPC ............ *H02J 7/0014* (2013.01); *Y02T 10/7055* (2013.01)
(58) Field of Classification Search
USPC ........................................................ 320/134
See application file for complete search history.

(56) References Cited

U.S. PATENT DOCUMENTS

| 7,508,165 | B2 * | 3/2009 | Sobue et al. | 320/118 |
| 2002/0190692 | A1 * | 12/2002 | Marten | 320/116 |
| 2005/0017682 | A1 * | 1/2005 | Canter et al. | 320/118 |
| 2008/0191663 | A1 * | 8/2008 | Fowler et al. | 320/118 |
| 2009/0027006 | A1 | 1/2009 | Vezzini et al. | |
| 2009/0167248 | A1 | 7/2009 | Murao et al. | |
| 2010/0085009 | A1 * | 4/2010 | Kang et al. | 320/118 |
| 2010/0156356 | A1 | 6/2010 | Asakura et al. | |

FOREIGN PATENT DOCUMENTS

| CN | 101636872 | 1/2010 |
| CN | 102203626 | 9/2011 |
| DE | 10-2009-002465 | 10/2010 |
| JP | H08-19188 | 1/1996 |
| JP | 4215152 | 5/2003 |
| JP | 2009-292282 | 12/2009 |

OTHER PUBLICATIONS

European Patent Application No. 12189676.5-1806/2592714: European Search Report dated Sep. 10, 2014, 7 pages.

* cited by examiner

*Primary Examiner* — Yalkew Fantu
(74) *Attorney, Agent, or Firm* — Baker & Hostetler LLP

(57) ABSTRACT

There is provided an apparatus for equalization of a battery pack that is composed of plural battery cells. The apparatus includes: a cell balancing device equalizing the voltages of the plural battery cells; a battery cell monitor monitoring the voltage and/or current of each battery cell; a correction voltage calculator calculating correction voltage for a subject battery cell that needs to be equalized, based on the monitored voltage and/or current of the subject battery cell, wherein the correction voltage depends on internal resistance of the subject battery cell; and a cell balancing controller determining the subject battery cell. The cell balancing controller corrects target voltage for equalization of the subject battery cell by the calculated correction voltage, and causes the cell balancing device to execute equalization of the subject battery cell so that the monitored voltage of the subject battery cell reaches the corrected target voltage.

17 Claims, 11 Drawing Sheets

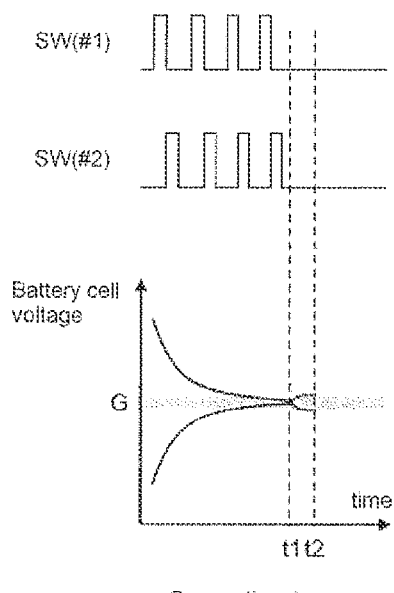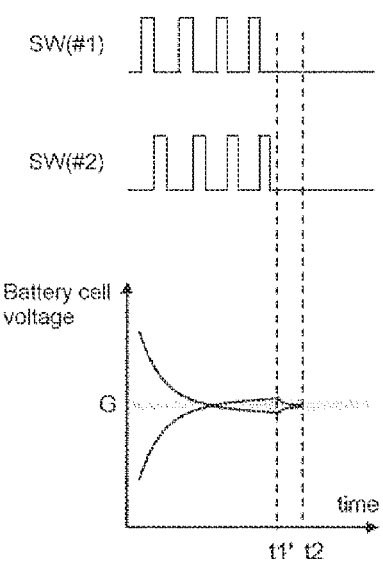

FIG. 6

| Internal resistance [mΩ] | Current [A] | | | | | | |
|---|---|---|---|---|---|---|---|
| | 20 | 40 | 60 | 80 | 100 | 120 | 140 |
| CCV[V] 3.00 | 40 | 50 | 60 | 70 | 80 | 90 | 100 |
| 3.04 | 38 | 48 | 57 | 66 | 75 | 84 | 93 |
| ⋮ | | | | | | | |
| 4.16 | 14 | 20 | 26 | 32 | 38 | 44 | 50 |
| 4.20 | 12 | 18 | 24 | 30 | 36 | 42 | 48 |

FIG. 9

| Internal resistance [mΩ] | | Temperature [°C] | | | | | | |
| --- | --- | --- | --- | --- | --- | --- | --- | --- |
| | | -30 | 0 | 10 | 25 | 40 | 50 | 60 |
| OCV[V] | 3.00 | 100 | 50 | 40 | 40 | 35 | 35 | 30 |
| | 3.04 | 98 | 48 | 38 | 38 | 33 | 33 | 31 |
| | ⋮ | | | | | | | |
| | 4.16 | 52 | 32 | 12 | 10 | 9 | 9 | 8 |
| | 4.20 | 50 | 30 | 10 | 8 | 7 | 7 | 6 |

APPARATUS AND METHOD FOR BATTERY EQUALIZATION

CROSS REFERENCE TO RELATED APPLICATIONS

This application claims priority to Japanese Patent Application No. 2011-244310 filed Nov. 8, 2011.

TECHNICAL FIELD

The present invention relates to an apparatus and a method for controlling equalization of the voltages of plural battery cells in a battery pack.

BACKGROUND

Vehicles having an electric motor in addition to an engine as a power source, such as hybrid car, plug-in hybrid car, hybrid vehicle and hybrid electric vehicle, and transport machinery (hereinafter referred to as vehicle) have been put into practical use. In addition, electric vehicles having no engine and driven only by an electric motor have also been put into practical use. A battery, such as a lithium-ion battery which is compact and has a large capacity, has been used as a power source for driving the electric motor for such vehicle. For vehicle application, the battery may be of a battery pack which is composed of plural cell blocks each having plural battery cells connected in series. The series connection of the battery cells allows supply of the voltage that is required to drive an electric motor of a vehicle and the series or parallel connection of the cell blocks allows supply of electrical current of the required capacity and also provides a higher voltage.

The property of a lithium-ion battery is varied greatly depending on the temperature, and the remaining capacity and charging efficiency of the battery are influenced greatly by the temperature in the environment where the battery is used. This is all the more true of the environment where the vehicle is used.

As a result, there occurs a great variation in the remaining capacity and the output voltage of the respective battery cells in the cell block. In this case, when the voltage of any one of the battery cells is decreased below a threshold, power supply for the whole of the battery needs to be stopped or suppressed, with the result that the power efficiency is lowered. Thus, battery equalization control for equalizing the voltages of the battery cells needs to be performed, and equalization of the voltages of the cell blocks also needs to be performed.

One of the known battery equalization method is a passive equalization that causes an overcharged or overdischarged battery cell to discharge through a bypass resistor connected in parallel to the battery cell so as to equalize the voltages of the battery cells. Another known battery equalization is an active equalization that takes charge from a battery cell of a higher voltage and delivers the charge to a battery cell of a lower battery cell through a converter circuit using an inductor or transformer. In either battery equalization, discharging or charging is done until the voltage of such battery cell reaches target voltage. In the active equalization, the target voltage corresponds to the average of the highest and lowest voltages of the plural battery cells. The battery cell with the highest voltage is discharged to the target voltage, while the battery cell with the lowest voltage is charged to the target voltage. In the passive equalization, the target voltage corresponds to the lowest voltage of the plural battery cells. The battery cells with higher voltages are discharged to the target voltage.

The battery cells have different internal resistances depending on the variation of the characteristics and the degree of deterioration of the respective battery cells. When the equalization is done so that the voltage of the battery cell reaches the target voltage, the voltage of the battery cell monitored during discharging or charging varies from the actual output voltage of the battery cell due to the internal resistance of the battery cell. Thus, when the equalization is done so that the monitored voltage of the battery cell reaches the target voltage, the final voltage of the battery cell is not the same due to the internal resistance of the battery cell. Correction of such variation requires repeated equalization and is time consuming, resulting in increased battery energy loss. In the active equalization, current for equalization is small when the monitored voltage is close to the target voltage, resulting in decreased efficiency and increased loss of the equalization circuit.

The present invention is directed to providing an apparatus and a method which allows quick and efficient equalization of the voltages of the plural battery cells having different internal resistances thereby to offer optimum equalization control.

SUMMARY

In accordance with an aspect of the present invention, there is provided an apparatus for equalization of a battery pack that is composed of plural battery cells. The apparatus includes: a cell balancing device equalizing the voltages of the plural battery cells; a battery cell monitor monitoring the voltage and/or current of each battery cell; a correction voltage calculator calculating correction voltage for a subject battery cell that needs to be equalized, based on the monitored voltage and/or current of the subject battery cell, wherein the correction voltage depends on internal resistance of the subject battery cell; and a cell balancing controller determining the subject battery cell from the plural battery cells, wherein the cell balancing controller corrects target voltage for equalization of the subject battery cell by the calculated correction voltage, and the cell balancing controller causes the cell balancing device to execute equalization of the subject battery cell so that the monitored voltage of the subject battery cell reaches the corrected target voltage.

In accordance with another aspect of the present invention, there is provided a method for equalization of a battery pack that is composed of plural battery cells. The method causes a cell balancing device to equalize the voltages of the plural battery cells. The method includes the steps of: monitoring the voltage and/or current of each battery cell; calculating correction voltage for a subject battery cell that needs to be equalized, based on the monitored voltage and/or current of the subject battery cell, wherein the correction voltage depends on internal resistance of the subject battery cell; determining the subject battery cell from the plural battery cells; correcting target voltage for equalization of the subject battery cell by the calculated correction voltage; and causing the cell balancing device to execute equalization of the subject battery cell so that the monitored voltage of the subject battery cell reaches the corrected target voltage.

Other aspects and advantages of the invention will become apparent from the following description, taken in conjunction with the accompanying drawings, illustrating by way of example the principles of the invention.

BRIEF DESCRIPTION OF THE DRAWINGS

FIGS. 3A and 3B are diagrams comparing the operations of the conventional case and the present embodiment;

FIG. 6 is an example of map data for use to determine the internal resistance of a battery cell from the voltage and the current of the battery cell;

FIG. 9 is an example of map data for use to determine the internal resistance a battery cell from the voltage and the temperature of the battery cell.

DETAILED DESCRIPTION OF ILLUSTRATIVE EMBODIMENTS

Figure 1:
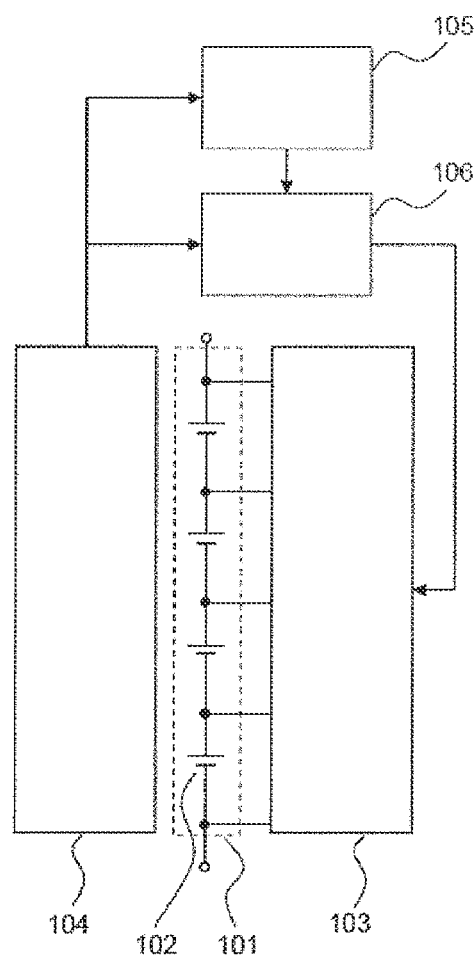
FIG. 1 is a block diagram of an embodiment of the present invention.

The following will describe the embodiments of the present invention with reference to the accompanying drawings. Referring to FIG. 1, plural battery cells 102 are connected in series to form a battery pack 101. A cell balancing device 103 serves to equalize the voltages of the plural battery cells 102 in the battery pack 101. The cell balancing device 103 may be provided, for example, by an active balancing circuit that takes charge from one or more battery cells 102 and delivers the charge to one or more of the remaining battery cells 102 thereby to equalize the voltages of the plural battery cells 102. Alternatively, the cell balancing device 103 may be provided by a passive balancing circuit that allows one or more selected battery cells 102 of the plural battery cells 102 to discharge so as to equalize the voltages of the plural battery cells 102.

A battery cell monitor 104 serves to monitor at least the voltage and/or the current of each battery cell 102. A correction voltage calculator 105 serves to calculate the correction voltage for the battery cell 102 that needs to be equalized, based on the voltage and/or the current of such battery cell 102 monitored by the battery cell monitor 104. The correction voltage depends on the internal resistance of the battery cell 102. The battery cell 102 that needs to be equalized will be hereinafter referred to as the subject battery cell 102.

When the battery pack 101 is in use to supply electric power, the correction voltage calculator 105, for example, refers to a map data for use to determine the internal resistance of a battery cell from the voltage and the current of the battery cell. Based on such map data and the voltage and the current of the subject battery cell 102 monitored by the battery cell monitor 104, the correction voltage calculator 105 determines the internal resistance of the subject battery cell 102, and then calculates the correction voltage for the subject battery cell 102 based on such internal resistance and the current of the subject battery cell 102 monitored by the battery cell monitor 104.

Alternatively, when the battery pack 101 is not in use to supply electric power, the correction voltage calculator 105 may calculate the amount of the voltage drop of the subject battery cell 102 that is monitored by the battery cell monitor 104 during the lapse of a given period of time from the start of the equalization by the cell balancing device 103 as the correction voltage for the subject battery cell 102.

Alternatively, it may be so configured that, when the battery pack 101 is in use to supply electric power, the battery cell monitor 104 also monitors the temperature of each battery cell 102 and the correction voltage calculator 105 refers to a map data for use to determine the internal resistance of a battery cell from the voltage, the current and the temperature of the battery cell. Based on such map data and the voltage, the current and the temperature of the subject battery cell 102 monitored by the battery cell monitor 104, the correction voltage calculator 105 determines the internal resistance of the subject battery cell 102, and then calculates the correction voltage for the subject battery cell 102 based on such internal resistance and the current of the subject battery cell 102 monitored by the battery cell monitor 104.

Alternatively, when the battery pack 101 is not in use to supply electric power, the battery cell monitor 104 may also be configured to monitor the temperature of each battery cell 102, and the correction voltage calculator 105 may refers to a map data for use to determine the internal resistance of a battery cell from the voltage and the temperature of the battery cell. Based on such map data and the voltage and the temperature of the subject battery cell 102 monitored by the battery cell monitor 104, the correction voltage calculator 105 determines the internal resistance of the subject battery cell 102, and then calculates the correction voltage for the subject battery cell 102 based on such internal resistance and the current of the subject battery cell 102 monitored by the battery cell monitor 104 after the start of the equalization by the cell balancing device 103.

Alternatively, when the battery pack 101 is not in use to supply electric power, the correction voltage calculator 105 may calculate the internal resistance of the subject battery cell 102 based on the voltage of the subject battery cell 102 and on the charging and discharging current flowing in the cell balancing device 103 monitored by the battery cell monitor 104.

A cell balancing controller 106 determines the subject battery cell 102 that needs to be equalized, and corrects the target voltage for equalization of the subject battery cell 102 by the correction voltage calculated by the correction voltage calculator 105. More specifically, when the subject battery cell 102 needs to be discharged, the cell balancing controller 106 corrects the target voltage by subtracting the calculated correction voltage from the target voltage. When the subject battery cell 102 needs to be charged, the cell balancing controller 106 corrects the target voltage by adding the calculated correction voltage to the target voltage. Subsequently, the cell balancing controller 106 causes the cell balancing device 103 to execute the equalization of the subject battery cell 102 so that the voltage of the subject battery cell 102 monitored through the battery cell monitor 104 reaches the corrected target voltage.

According to the above-described configuration, the correction voltage calculator 105 can calculate the correction voltage for the subject battery cell 102 depending on the internal resistance of the subject battery cell 102. The correction of the target voltage for equalization control by such correction voltage prevents the target voltage from varying due to the internal resistance of the subject battery cell 102. Additionally, the time taken to complete the equalization can be reduced and the time in which charging and discharging current during the equalization is small can be shortened in an active cell balancing method, resulting in increased efficiency and reduced loss of the equalization.

In such active cell balancing method, equalization control may be performed also when the battery pack 101 is in use to supply electric power to an electric motor of a vehicle. Also in this case, the internal resistance of the subject battery cell 102 can be calculated from the map data for use to determine the internal resistance of the battery cell 102 from the monitored voltage and current of the battery cell 102, and then the correction voltage can be calculated from such internal resistance and the monitored current.

When the battery pack 101 is not in use to supply electric power, the amount of the voltage drop of the subject battery cell 102 occurring during the lapse of a given period of time from the start of the equalization may be calculated as the correction voltage for the subject battery cell 102 depending on the internal resistance of the subject battery cell 102. Alternatively, when the battery pack 101 is not in use to supply electric power, the internal resistance of the subject battery cell 102 can be calculated from the map data for use to determine the internal resistance of the battery cell 102 from the monitored voltage and the temperature of the battery cell 102, and the correction voltage can be calculated from such internal resistance and the current monitored after a start of the equalization control.

Figure 2A:
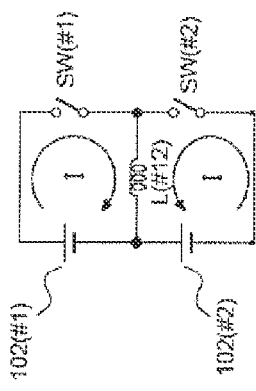
FIGS. 2A and 2B are diagrams explaining the operation of the embodiment of FIG. 1.
Figure 2B:
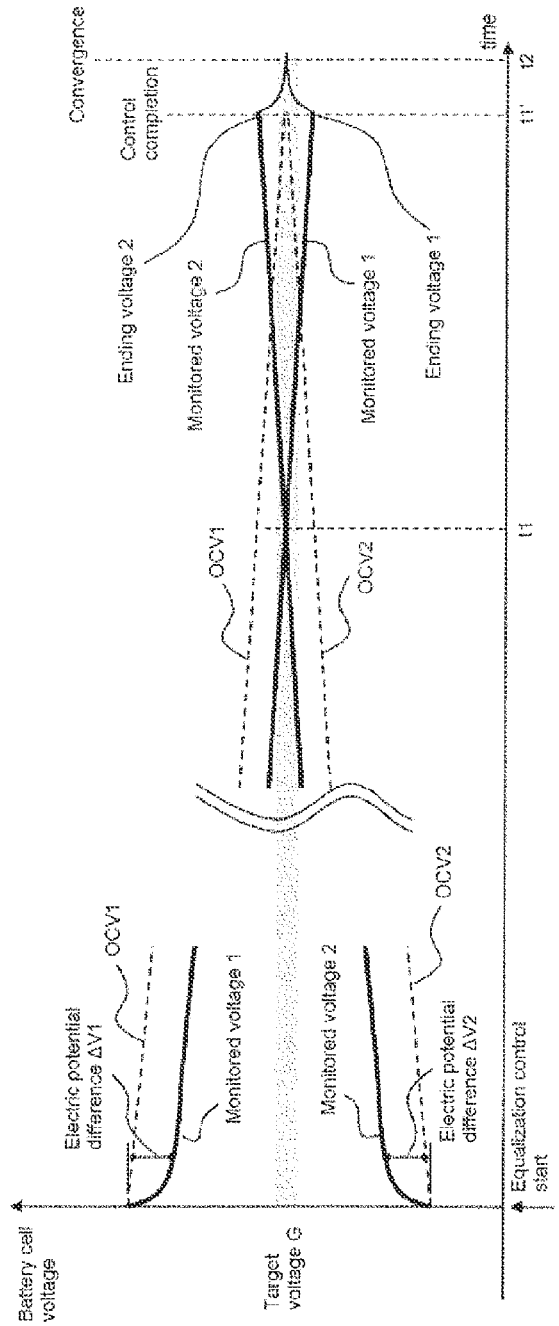

FIGS. 2A and 2B are diagrams explaining the operation of the embodiment of FIG. 1. FIGS. 3A and 3B are diagrams comparing the operation of the conventional case and the present embodiment. When the cell balancing device 103 of FIG. 1 is provided, for example, by an active cell balancing circuit as shown in FIG. 2A, one end of an inductor L (#12) is connected to the connection of two battery cells 102 (#1) and 102 (#2) connected in series. The other end of the inductor L (#12) is connected through a switching device SW (#1) to a positive terminal of the battery cell 102 (#1) and also connected through a switching device SW (#2) to a negative terminal of the battery cell 102 (#2). A circuit for the four batteries cells 102 connected in series as shown in FIG. 1 is configured in a similar manner (see the cell balancing circuit 103 of FIG. 4 which will be described later). For example, when the battery cell 102 (#1) has maximum voltage and the battery cell 102 (#2) has minimum voltage, allowing the switching device SW (#1) to turn on and off intermittently at a frequency of tens to hundreds of kilohertz, electric charge discharged from the battery cell 102 (#1) is stored in the inductor L (#12). Allowing the switching device SW (#2) to turn on and off intermittently in synchronization with the operation of the switching device SW (#1) in such a way that the switching device SW (#2) is turned on just after the switching device SW (#1) is turned off, the battery cell 102 (#2) is charged by the inductor L (#12). In this way, the voltages of the battery cell 102 (#1) and the battery cell 102 (#2) are equalized.

In this case, the ideal voltage OCV1 of the battery cell 102 (#1) is gradually decreased by discharging from its initial maximum value as indicated by dotted line in FIG. 2B, while the ideal voltage OCV2 of the battery cell 102 (#2) is gradually increased by charging from its initial minimum value as indicated by dotted line in FIG. 2B. The target voltage G for equalization control is given, for example, by the following formula (1).

$$\text{Target voltage } G = (OCV1 + OCV2)/2 \quad (1)$$

However, the voltage of the battery cell 102 (#1) actually monitored by the battery cell monitor 104 of FIG. 1 after a lapse of a given period of time (or a few seconds) from the start of the equalization control has a value that is lower than the ideal voltage OCV1 by the electric potential difference V1, as indicated by solid line in FIG. 2B. On the other hand, the voltage of the battery cell 102 (#2) actually monitored by the battery cell monitor 104 after a lapse of a given period of time (or a few seconds) from the start of the equalization control has a value that is higher than the ideal voltage OCV2 by the electric potential difference V2, as indicated by solid line in FIG. 2B. These electric potential differences V1, V2 are caused by the internal resistances including polarization resistances of the battery cells 102 (#1) and 102 (#2), respectively.

In the conventional case, the equalization control is done so that the monitored voltages 1, 2 fall within a predetermined allowable range of the target voltage G. Thus, the monitored voltage 1 and the monitored voltage 2 nearly coincide with each other and reach the target voltage G at the time t1 in FIG. 2B, and the equalization control for the battery cells 102 (#1) and 102 (#2) is completed. Though depending on various factors such as the characteristics of the battery pack 101 and the level of the equalization control, the time t1 taken to execute such equalization control is, for example, a few hours.

In such conventional case, however, because no average current I flows in the cell balancing circuit of FIG. 2A after the completion of the equalization control, the monitored voltage 1 is increased by the internal resistance of the battery cell 102 (#1) times the average current I, while the monitored voltage 2 is decreased by the internal resistance of the battery cell 102 (#2) times the average current I, as shown in FIG. 3A. As a result, after the completion of the equalization control at the time t1, the voltages of the battery cells 102 (#1) and 102 (#2) both deviate from the target voltage G, as shown in FIG. 3A, and the voltages of the battery cells 102 (#1) and 102 (#2) at the time of convergence t2 are not equalized.

In the present embodiment, the electric potential differences V1, V2 (both having a positive value) caused by the internal resistances of the battery cells 102 (#1) and 102 (#2) are calculated by the correction voltage calculator 105 of FIG. 1 as the correction voltages for the respective battery cells 102 (#1) and 102 (#2). With respect to the battery cell 102 (#1) to be discharged, the cell balancing controller 106 of FIG. 1 corrects the target voltage G according to the following formula:

$$\text{Ending voltage 1} = \text{Target voltage } G - \text{Correction voltage } \Delta V1 \quad (2)$$

so that the equalization is completed when the monitored voltage 1 reaches the ending voltage 1, that is, the corrected target voltage. With respect to the battery cell 102 (#2) to be charged, on the other hand, the cell balancing controller 106 corrects the target voltage G according to the following formula:

$$\text{Ending voltage 2} = \text{Target voltage } G + \text{Correction voltage } \Delta V2 \quad (3)$$

so that the equalization is completed when the monitored voltage 2 reaches the ending voltage 2, that is, the corrected target voltage.

As a result, the equalization control for the battery cells 102 (#1) and 102 (#2) in the present embodiment is completed at the time t1' in FIG. 2B. At the time t1', the voltage of the battery cell 102 (#1) to be discharged is lower than the target voltage G by the internal resistance of the battery cell 102 (#1) times the average current I flowing in the cell balancing circuit, while the voltage of the battery cell 102 (#2) to be charged is higher than the target voltage G by the internal resistance of the battery cell 102 (#2) times the average current I flowing in the cell balancing circuit. In the present embodiment, as shown in FIGS. 2B and 3B, since no average current I flows in the cell balancing circuit of FIG. 2A after the completion of the equalization control, the monitored voltage 1 is increased by the internal resistance of the battery cell 102 (#1) times the average current I after the time t1', nearly coinciding with the target voltage G. The monitored voltage 2 is decreased by the internal resistance of the battery cell 102 (#2) times the average current I after the time t1', nearly coinciding with the target voltage G. In this way, the present embodiment allows equalization of the voltages of the battery cells 102 (#1) and 102 (#2) at the time of convergence t2 after the time t1' of the completion of the equalization control.

Figure 4:
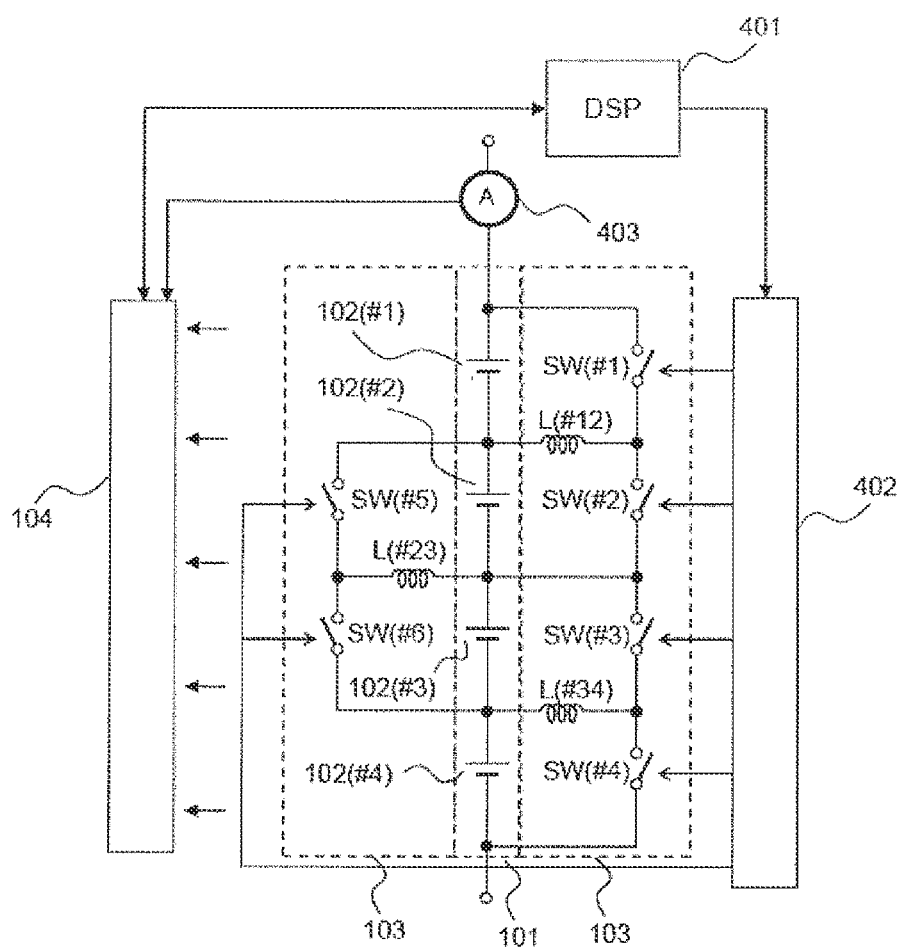
FIG. 4 is a specific circuit diagram of the present embodiment.

Referring to FIG. 4 showing a circuit diagram of the present embodiment, the battery pack 101, the battery cells 102 (#1) to 102 (#4), the cell balancing circuit 103 and the battery cell monitor 104 correspond to the battery pack 101, the battery cells 102, the cell balancing device 103 and the battery cell monitor 104, respectively, of FIG. 1. The battery cell monitor 104 monitors the voltage of the battery cells 102 (#1) to 102 (#4) and transmits information about the voltages to a DSP (digital signal processor) 401. The battery cell monitor 104 also monitors the current flowing in the battery cells 102 of the battery pack 101 and measured by a current meter 403, and transmits information about the currents to the DSP 401. The battery cell monitor 104 further monitors the temperature around each battery cell 102 by using a sensor (not shown) and transmits temperature information to the DSP 401. Such temperature information is used in the control procedure of the flow chart of FIG. 8 which will be described later. The DSP 401 functions as the correction voltage calculator 105 of FIG. 1 to calculate the correction voltage and also as the cell balancing controller 106 to calculate the target voltage. A switching controller 402 cooperates with the DSP 401 to function as the cell balancing controller 106 of FIG. 1 to execute the equalization control.

The cell balancing circuit 103 has a circuit configuration for equalization control provided by an active cell balancing circuit as in the case of FIG. 2A. In this configuration, one ends of the respective inductors L (#12), L (#23) and L (#34) are connected to the respective connections of the four battery cells 102 (#1), 102 (#2), 102 (#3) and 102 (#4) that are connected in series. The other end of the inductor L (#12) is connected through a switching device SW (#1) to the positive terminal of the battery cell 102 (#1) and also connected through a switching device SW (#2) to the negative terminal of the battery cell 102 (#2). The other end of the inductor L (#23) is connected through a switching device SW (#5) to the positive terminal of the battery cell 102 (#2) and also connected through a switching device SW (#6) to the negative terminal of the battery cell 102 (#3). The other end of the inductor L (#34) is connected through a switching device SW (#3) to the positive terminal of the battery cell 102 (#3) and also connected through a switching device SW (#4) to the negative terminal of the battery cell 102 (#4).

For the execution of the equalization control, the DSP 401 periodically determines the magnitude of the voltages of the respective battery cells 102 (#1) to 102 (#4) transmitted from the battery cell monitor 104. The DSP 401 then extracts a pair of adjacent battery cells 102 having the largest voltage difference therebetween from any two adjacent battery cells 102 (#1) and 102 (#2), 102 (#2) and 102 (#3), and 102 (#3) and 102 (#4). For example, when the voltage difference between the battery cells 102 (#1) and 102 (#2) is the largest, the DSP 401 operates the switching devices SW (#1) and SW (#2) through the switching controller 402 so that the battery cell 102 of a higher voltage is discharged and the battery cell 102 of a lower voltage is charged through the inductor L (#12). In this case, the switching device SW associated with the battery cell 102 of a higher voltage is turned on firstly. When the voltage difference between the battery cells 102 (#2) and 102 (#3) is the largest, the DSP 401 operates the switching devices SW (#5) and SW (#6) through the switching controller 402 so that the battery cell 102 of a higher voltage is discharged and the battery cell 102 of a lower voltage is charged through the inductor L (#23). When the voltage difference between the battery cells 102 (#3) and 102 (#4) is the largest, the DSP 401 operates the switching devices SW (#3) and SW (#4) through the switching controller 402 so that the battery cell 102 of a higher voltage is discharged and the battery cell 102 of a lower voltage is charged through the inductor L (#34).

Of the switching devices SW (#1) to SW (#6), the switching device determined by the DSP 401 is turned on and off repeatedly by the switching controller 402 at the frequency and the duty ratio determined by the DSP 401. Such switching operation is controlled in such a way that firstly the switching device SW connected to the battery cell 102 of a higher voltage is turned on and off, and then the switching device SW connected to the battery cell 102 of a lower voltage is turned on and off just after the switching device SW connected to the battery cell 102 of a higher voltage is turned off. By so controlling, firstly, the electric power discharged from the battery cell 102 of a higher voltage is stored in the inductor L, and just after that, the electric power stored in the inductor L is charged in the battery cell 102 of a lower voltage.

Figure 5:
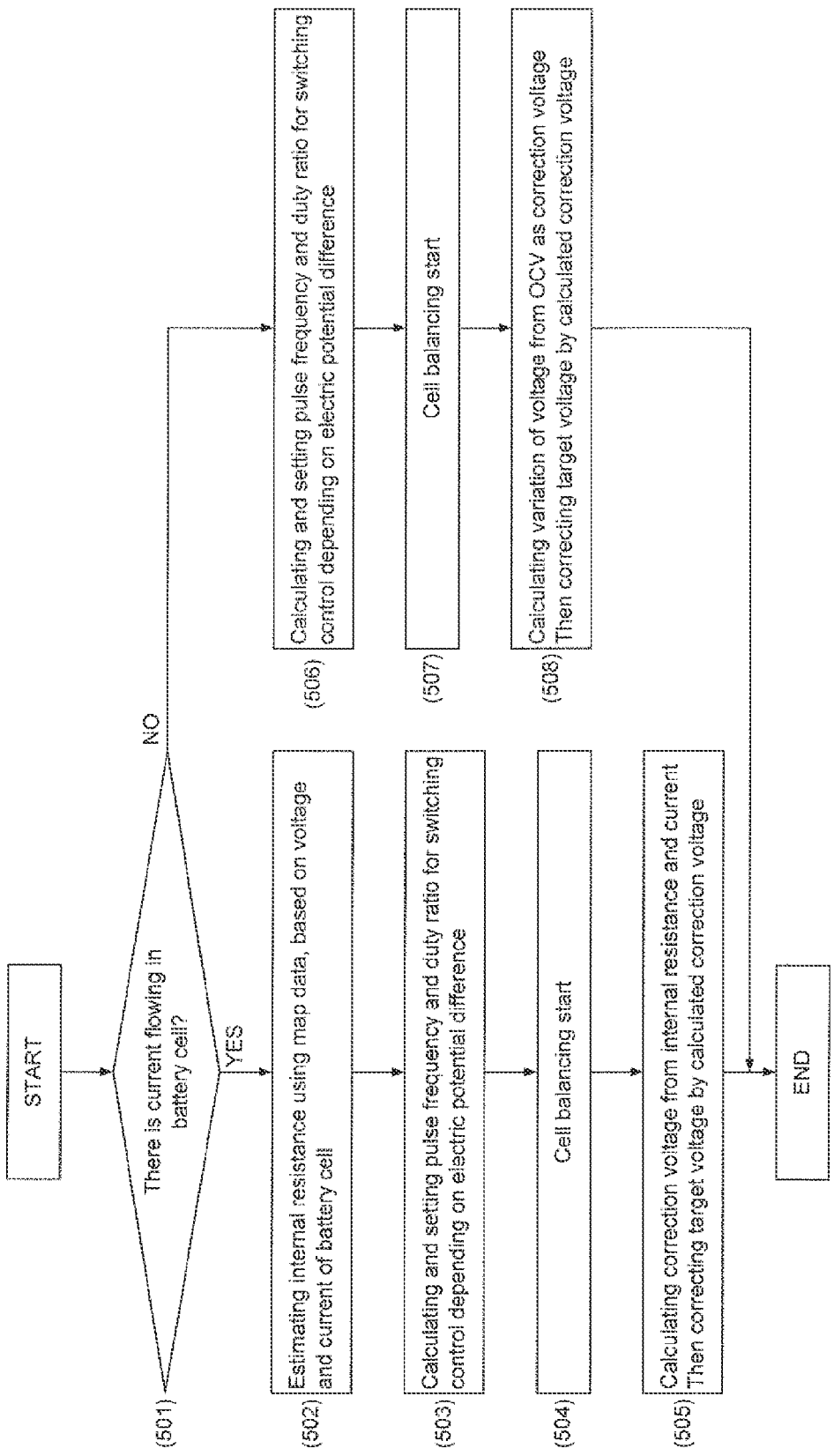
FIG. 5 is a flow chart of a first example of a control procedure for starting battery equalization executed by a DSP.

FIG. 5 is a flow chart of a first example of the control procedure for starting equalization that is executed by the DSP 401. Such control procedure is provided, for example, by a control program stored in a memory (not shown) and executed by a processor (not shown) in the DSP 401. Alternatively, the control procedure may be executed by the combination of a firmware, a software and a hardware in the DSP 401.

Although not described in detail, before the execution of the control procedure of the flow chart of FIG. 5, the DSP 401 executes a control procedure that is different from the above procedure and extracts the subject battery cells 102 that need to be equalized.

Firstly, based on the information transmitted from the current meter 403 through the battery cell monitor 104 of FIG. 4, the DSP 401 determines at step S501 whether or not there is a current flowing in the battery cell 102. When it is determined at step S501 that there is a current flowing in the battery cell 102 and hence the battery pack 101 is in use to supply electric power, the DSP 401 obtains the voltage and the current of the subject battery cell 102 monitored by the battery cell monitor 104. By using the information of the voltage and the current, the DSP 401 estimates at step S502 the internal resistance of the subject battery cell 102 by referring to the map data that is for use to determine the internal resistance of a battery cell from the voltage and the current of the battery cell. FIG. 6 shows an example of the map data stored in the DSP 401. On the map data of FIG. 6, data of internal resistance (mΩ: milliohm) corresponding to the voltage CCV (V: volt) and the current (A: ampere) of the subject battery cell 102 is read out. For example, when the voltage CCV is 3.04 V and the current is 80 A, the internal resistance is 66 nm. In this way, the data of the internal resistance of the battery cell 102 is previously prepared in the form of the map data in association with the data of the respective voltages and the currents of the battery cell 102. In the present embodiment, the use of such map data allows estimation of the internal resistance of the battery cell 102 when the battery pack 101 is in use to supply electric power.

Depending on the electric potential difference between the two subject battery cells 102, the DSP 401 calculates at step S503 the pulse frequency and the duty ratio for switching control of the switching device SW of FIG. 4 based on the following formulae (4) and (5), and then sets the calculated frequency and duty ratio for the switching controller 402.

$$I_L = \alpha \cdot I_{max} \cdot \Delta V \quad (4)$$

$$I_L = \{E2 \cdot D - E1 \cdot (1-D)\}/L \cdot \text{freq} \quad (5)$$

where E1, E2 denote the voltages of the two subject battery cells 102 and are in the relation E1>E2. ΔV denotes the electric potential difference between the subject battery cells 102 and is calculated by the formula ΔV=E1−E2. $I_{max}$ denotes the allowable current flowing in the battery cell 102, and α denotes appropriately chosen weighting coefficient. Based on these parameters and the formula (4), the current $I_L$ flowing in the inductor L connected to the switching device SW in operation is calculated. The duty ratio D is calculated by assigning the current $I_L$, the inductance L and a predetermined pulse frequency freq to the formula (5). α in the formula (4) is a simple proportionality coefficient, but may be variable depending on the electric potential difference ΔV so that, for example, the current is constant when the electric potential difference ΔV is above a threshold while the current is decreased when the electric potential difference ΔV falls below the threshold. In the calculation using the formula (5), the pulse frequency freq may be calculated using an arbitrarily determined duty ratio D.

At step S504, the DSP 401 transmits a command to the switching controller 402 to start cell balancing operation (equalization control). The DSP 401 calculates the correction voltage by multiplying the internal resistance estimated at step S502 by the current monitored by the current meter 403 and the battery cell monitor 104. The DSP 401 corrects the target voltage for the subject battery cell 102 of a higher voltage or a lower voltage based on the above-mentioned formula (2) or (3) at step S505, and then the control procedure of starting equalization ends.

When it is determined at step S501 that no current flows in the battery cell 102 and hence the battery pack 101 is not in use to supply electric power, the DSP 401 executes the following control procedure for the subject battery cell 102.

Depending on the electric potential difference between the two subject battery cells 102, the DSP 401 calculates the pulse frequency and the duty ratio for switching control of the switching device SW of FIG. 4 based on the following formulae (4) and (5), and then sets the calculated frequency and the duty ratio for the switching controller 402, at step S506. The processing at step S506 is the same as that at step S503.

The DSP 401 transmits a command signal to the switching controller 402 to start cell balancing operation (equalization control) at step S507. At the beginning of the equalization at step S507, the DSP 401 receives from the battery cell monitor 104 the information of the voltage of the subject battery cell 102 corresponding to OCV of FIG. 2. After the lapse of a given period of time from the start of the cell balancing, the DSP 401 also receives from the battery cell monitor 104 the voltage information of the subject battery cell 102. The DSP 401 calculates the absolute value of the difference of such two voltages, that is, the variation of voltage from OCV occurring during such period of time, as the correction voltage. The DSP 401 corrects the target voltages for the subject battery cells 102 of a higher voltage or a lower voltage based on the above-mentioned formula (2) or (3) at step S508, and then the control procedure of starting equalization ends.

After the execution of the control procedure of FIG. 5, the DSP 401 determines whether or not the voltage of the subject battery cell 102 monitored by the battery cell monitor 104 during the equalization falls within a predetermined allowable range of the target voltage corrected at step S505 or S508 of the control procedure of FIG. 5. When the voltage of the subject battery cell 102 falls within the range, the DSP 401 transmit a command signal to the switching controller 402 to stop the switching operation of the switching device SW associated with the subject battery cell 102, and then the control procedure of equalization is completed.

Figure 7:
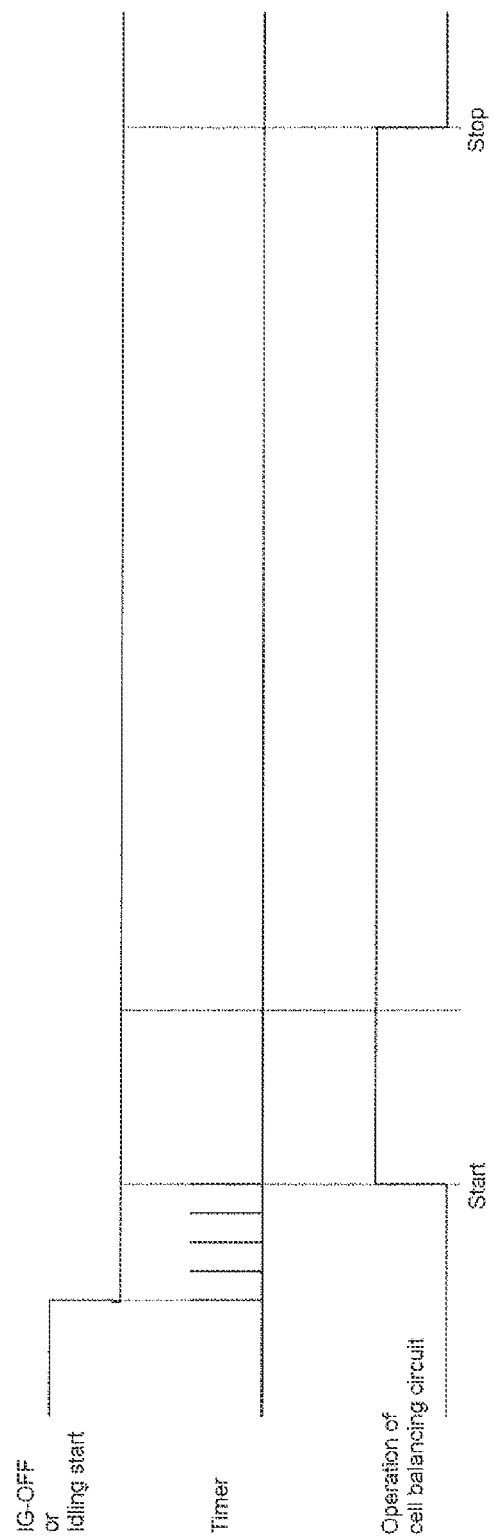
FIG. 7 is a timing chart of cell balancing operation of the present embodiment.

FIG. 7 shows an example of a timing chart of the cell balancing operation of the present embodiment. In the case that the battery system as shown in FIG. 4 is installed in a vehicle, a timer is started to count the time after ignition is turned off (IG-OFF) or the vehicle starts idling. After the lapse of a given period of time, the DSP 401 starts the equalization by the cell balancing circuit 103. Then the DSP 401 stops the operation of the cell balancing circuit 103 at the completion of the equalization of all battery cells 102. The equalization of the present embodiment may be started also when the ignition is turned on.

Figure 8:
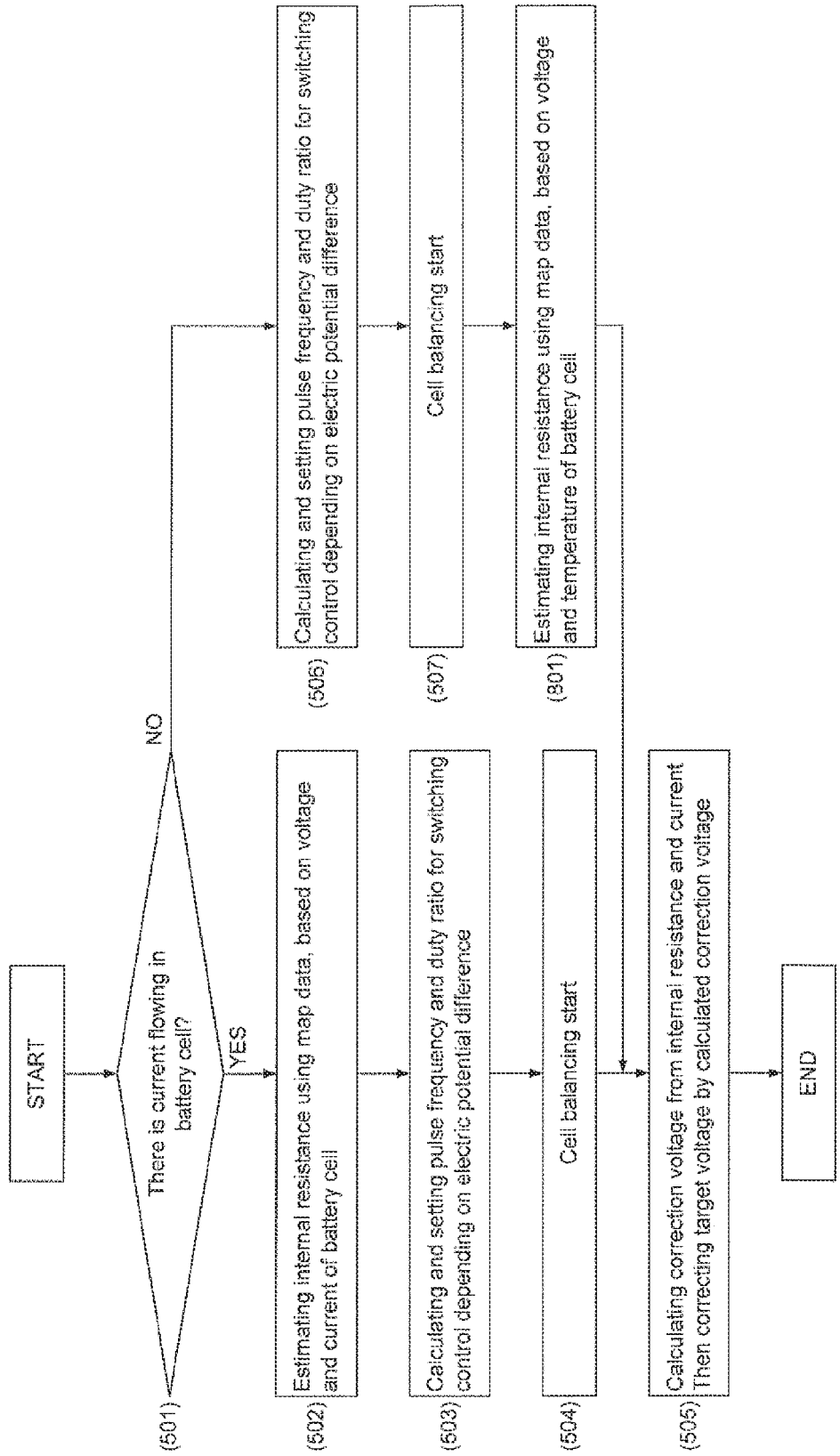
FIG. 8 is a flow chart of a second example of a control procedure for starting battery equalization executed by the DSP.

FIG. 8 is a flow chart of a second example of the control procedure for starting equalization that is executed by the DSP 401. Such control procedure is provided, for example, by a control program stored in a memory (not shown) and executed by a processor (not shown) in the DSP 401, as in the case of the control procedure of FIG. 5.

Although not described in detail, before the execution of the control procedure of the flow chart of FIG. 8, the DSP 401 executes a control procedure that is different from the above procedure and extracts the subject battery cells 102 that need to be equalized.

In the control procedure of FIG. 8 and the above-mentioned procedure of FIG. 5, same reference numerals are used for the same steps. The control procedure of FIG. 8 differs from the procedure of FIG. 5 in the manner of correcting the target voltage executed by the DSP 401 when it is determined at step S501 that there is no current flowing in the battery cell 102 and hence the battery pack 101 is not in use to supply electric power.

In this case, depending on the electric potential difference between the two subject battery cells 102, the DSP 401 calculates the pulse frequency and the duty ratio for switching control of the switching device SW of FIG. 4 based on the following formulae (4) and (5), and then sets the calculated frequency and the duty ratio for the switching controller 402, at step S506, as in the case of the control procedure of FIG. 5. The DSP 401 transmits a command signal to the switching controller 402 to start cell balancing operation (equalization control) at step S507.

Then the DSP 401 obtains the voltage and the ambient temperature of the subject battery cell 102 monitored by the battery cell monitor 104. By using the information of the voltage and the temperature, the DSP 401 estimates at step S801 the internal resistance of the subject battery cell 102 by referring to a map data that is for use to determine the internal resistance of a battery cell from the voltage and the temperature of the battery cell. FIG. 9 shows an example of the map data stored in the DSP 401. On the map data of FIG. 9, data of internal resistance (mΩ: milliohm) corresponding to the voltage OCV (V: volt) and the temperature (° C.: degree Celsius) of the subject battery cell 102 is read out. For example, when the voltage OCV is 3.04 V and the temperature is 25° C., the internal resistance is 38 mΩ. In this way, the data of the internal resistance of the battery cell 102 is previously prepared in the form of the map data in association with the data of the respective voltages and the temperatures of the battery cell 102. In the present embodiment, the use of such map data allows estimation of the internal resistance of the battery cell 102 when the battery pack 101 is not in use to supply electric power.

The DSP 401 calculates the correction voltage by multiplying the internal resistance estimated at step S801 by the current monitored by the current meter 403 and the battery cell monitor 104. The DSP 401 corrects the target voltage for the subject battery cell 102 of a higher voltage or a lower voltage based on the above-mentioned formula (2) or (3) at step S505, and then the control procedure of starting equalization ends.

As described above, according to the control procedure for starting equalization executed by the DSP 401 according to the flow chart of FIG. 5 or 8, either when the battery pack 101 of FIG. 4 is in use to supply electric power and hence the vehicle is running, or when the battery pack 101 is not in use to supply electric power and hence the vehicle is idling or not in motion, the target voltage for equalization control can be appropriately determined, thereby resulting in optimum equalization of the voltages of the plural battery cells 102.

Though the cell balancing circuit 103 of the above-described embodiments with reference to FIGS. 1 through 9 has a circuit configuration for equalization control provided by an active balancing circuit, the circuit configuration of the cell balancing circuit 103 is not limited to the above-described circuit configuration.

Figure 10A:
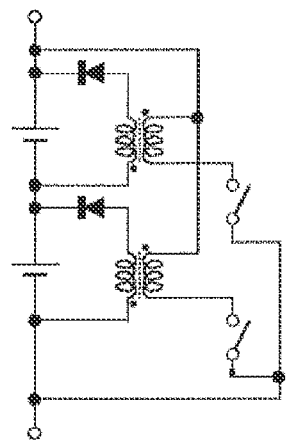
FIGS. 10A to 10C, 11A and 11B show examples of a cell balancing circuit.
Figure 10B:
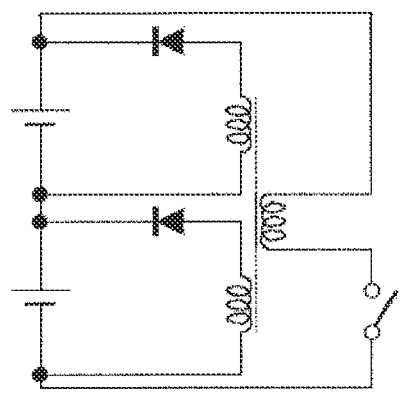
Figure 10C:
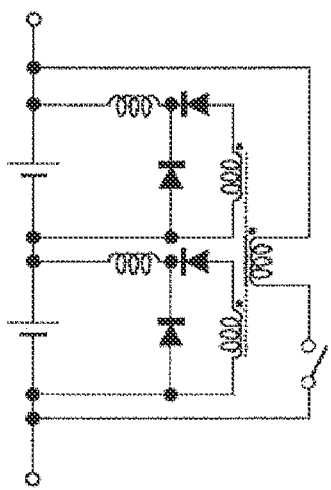

The cell balancing circuit 103 may be provided, for example, by a flyback or forward balancing circuit using transformers and rectifying diodes as shown in FIGS. 10A, 10B and 10C so as to connect the battery cell 102 (#1) of a higher voltage to the battery cell 102 (#2) of a lower voltage.

Figure 11A:
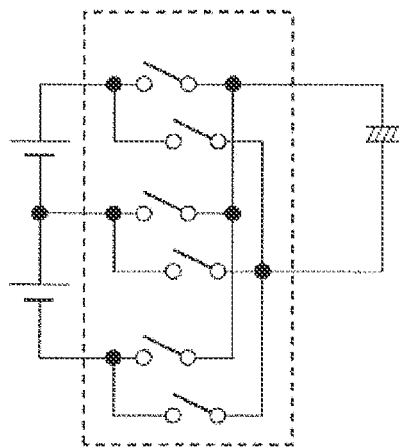

Alternatively, the cell balancing circuit 103 may be provided by a capacitor balancing circuit using a capacitor and switching devices as shown in FIG. 11A so as to connect the battery cell 102 (#1) of a higher voltage to the battery cell 102 (#2) of a lower voltage.

Figure 11B:
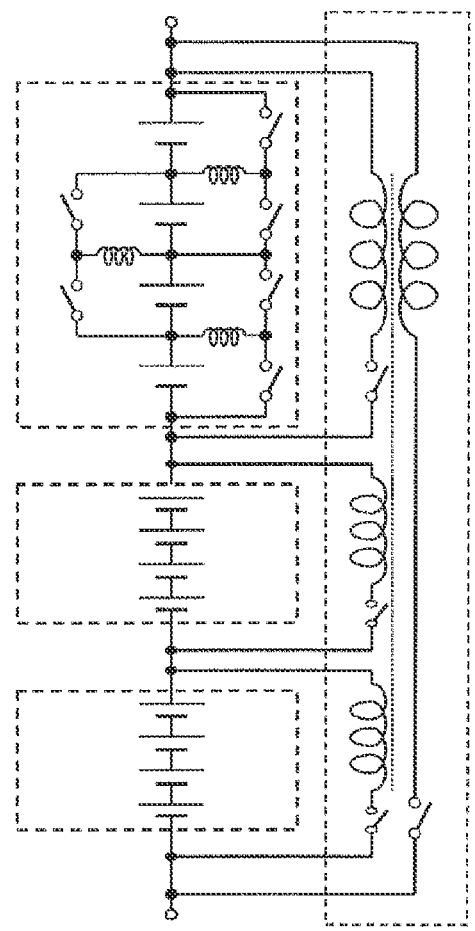

Alternatively, the cell balancing circuit 103 may be provided by a balancing circuit that is a combination of a transformer type circuit and a converter type circuit using an inductor as shown in FIG. 11B so as to connect the battery cell 102 (#1) of a higher voltage to the battery cell 102 (#2) of a lower voltage.

Alternatively, the cell balancing circuit 103 may be provided not only by the active balancing circuit as shown in FIGS. 10A to 10C, 11A and 11B, but also by a passive balancing circuit using a bypass circuit that has switches and resistors connected in parallel to the respective battery cells 102 so as to cause the battery cells 102 only to discharge.

What is claimed:

1. An apparatus for equalization of a battery pack that is composed of plural battery cells, comprising:
   a cell balancing device equalizing the voltages of the plural battery cells;
   a battery cell monitor monitoring the voltage and/or current of each battery cell;
   a correction voltage calculator calculating correction voltage for a subject battery cell that needs to be equalized, based on the monitored voltage and/or current of the subject battery cell, wherein the correction voltage depends on internal resistance of the subject battery cell; and
   a cell balancing controller determining the subject battery cell from the plural battery cells, wherein the cell balancing controller corrects target voltage for equalization of the subject battery cell by the calculated correction voltage, and the cell balancing controller causes the cell balancing device to execute equalization of the subject battery cell so that the monitored voltage of the subject battery cell reaches the corrected target voltage.

2. The apparatus of claim 1, wherein when the battery pack is in use to supply electric power, the correction voltage calculator refers to a map data for use to determine internal resistance of the subject battery cell from the monitored voltage and current of the subject battery cell, and the correction voltage calculator calculates the correction voltage based on the determined internal resistance and the monitored current of the subject battery cell.

3. The apparatus of claim 1, wherein when the battery pack is not in use to supply electric power, the correction voltage calculator calculates the amount of voltage drop of the subject battery cell during the lapse of a given period of time from the start of the equalization as the correction voltage.

4. The apparatus of claim 1, wherein when the battery pack is not in use to supply electric power, the correction voltage calculator calculates the correction voltage based on the amount of voltage drop of the subject battery cell during the lapse of a given period of time from the start of the equalization and on charging and discharging current flowing in the cell balancing device.

5. The apparatus of claim 1, wherein the battery cell monitor monitors the temperature of each battery cell, when the battery pack is in use to supply electric power, the correction voltage calculator refers to a map data for use to determine internal resistance of the subject battery cell from the monitored voltage, current and temperature of the subject battery cell, and the correction voltage calculator calculates the correction voltage based on the determined internal resistance and the monitored current of the subject battery cell.

6. The apparatus of claim 1, wherein the battery cell monitor monitors the temperature of each battery cell, when the battery pack is not in use to supply electric power, the correction voltage calculator refers to a map data for use to determine internal resistance of the subject battery cell from the monitored voltage and temperature of the subject battery cell, and the correction voltage calculator calculates the correction voltage based on the determined internal resistance and the current of the subject battery cell monitored after the start of the equalization.

7. The apparatus of claim 1, wherein the cell balancing controller corrects the target voltage by subtracting the calculated correction voltage from the target voltage when the subject battery cell needs to be discharged, and the cell balancing controller corrects the target voltage by adding the calculated correction voltage to the target voltage when the subject battery cell needs to be charged.

8. The apparatus of claim 1, wherein the cell balancing device takes charge from one or more battery cells and delivers the charge to one or more of the remaining battery cells so as to equalize the voltages of the plural battery cells.

9. The apparatus of claim 1, wherein the cell balancing device allows one or more selected battery cells of the plural battery cells to discharge so as to equalize the voltages of the plural battery cells.

10. A method for equalization of a battery pack that is composed of plural battery cells, the method causing a cell balancing device to equalize the voltages of the plural battery cells,
   the method comprising the steps of:
   monitoring the voltage and/or current of each battery cell;
   calculating correction voltage for a subject battery cell that needs to be equalized, based on the monitored voltage and/or current of the subject battery cell, wherein the correction voltage depends on internal resistance of the subject battery cell;
   determining the subject battery cell from the plural battery cells;

correcting target voltage for equalization of the subject battery cell by the calculated correction voltage; and causing the cell balancing device to execute equalization of the subject battery cell so that the monitored voltage of the subject battery cell reaches the corrected target voltage.

11. The method of claim 10, wherein when the battery pack is in use to supply electric power, internal resistance of the subject battery cell is determined by referring to a map data for use to determine internal resistance of the battery cell from the monitored voltage and current of the battery cell, and the correction voltage is calculated based on the determined internal resistance and the monitored current of the subject battery cell.

12. The method of claim 10, wherein when the battery pack is not in use to supply electric power, the amount of voltage drop of the subject battery cell during the lapse of a given period of time from the start of the equalization is calculated as the correction voltage.

13. The method of claim 10, wherein the temperature of each battery cell is monitored, when the battery pack is in use to supply electric power, internal resistance of the subject battery cell is determined by referring to a map data for use to determine internal resistance of the battery cell from the monitored voltage, current and temperature of the battery cell, and the correction voltage is calculated based on the determined internal resistance and the monitored current of the subject battery cell.

14. The method of claim 10, wherein the temperature of each battery cell is monitored, when the battery pack is not in use to supply electric power, internal resistance of the subject battery cell is determined by referring to a map data for use to determine internal resistance of the battery cell from the monitored voltage and temperature of the battery cell, and the correction voltage is calculated based on the determined internal resistance and the current of the subject battery cell monitored after the start of the equalization.

15. The method of claim 10, wherein the target voltage is corrected by subtracting the calculated correction voltage from the target voltage when the subject battery cell needs to be discharged, and the target voltage is corrected by adding the calculated correction voltage to the target voltage when the subject battery cell needs to be charged.

16. The method of claim 10, wherein the method causes the cell balancing device to take charge from one or more battery cells and to deliver the charge to one or more of the remaining battery cells so as to equalize the voltages of the plural battery cells.

17. The method of claim 10, wherein the method causes the cell balancing device to allow one or more selected battery cells of the plural battery cells to discharge so as to equalize the voltages of the plural battery cells.

* * * * *